Patented July 8, 1930

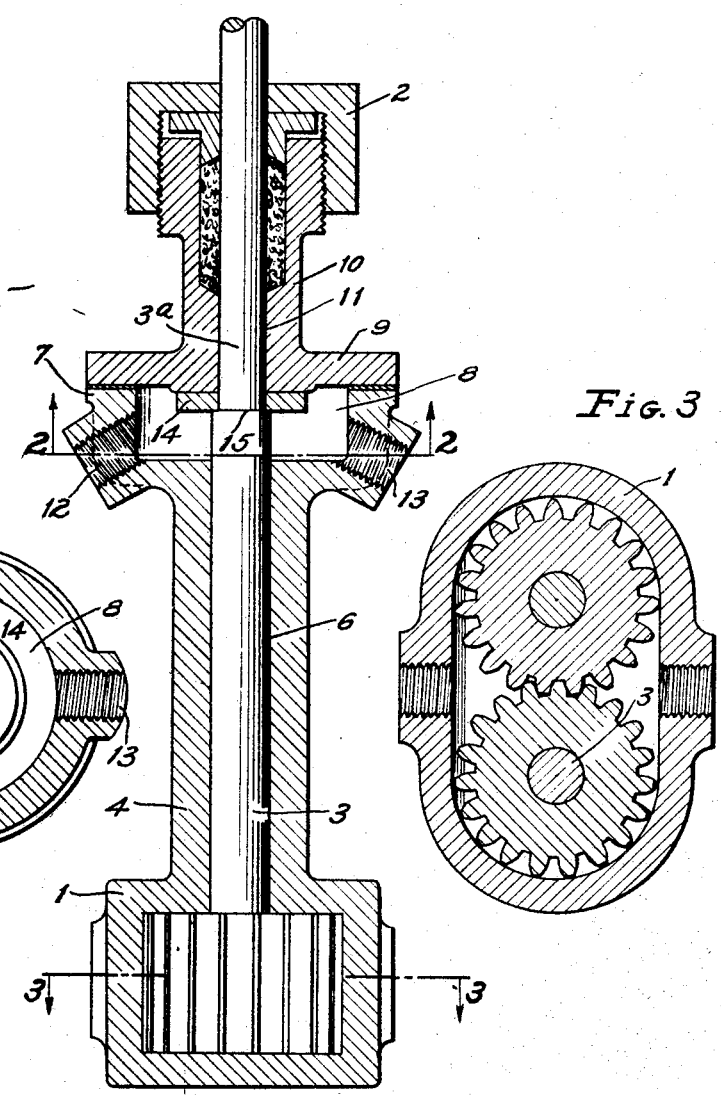

1,770,053

UNITED STATES PATENT OFFICE

RUSSELL R. WATERMAN, OF LONG BEACH, CALIFORNIA, ASSIGNOR TO FARMERS' NATIONAL BANK, OF GREENVILLE, OHIO, OF GREENVILLE, OHIO, A CORPORATION OF OHIO, TRUSTEE

CIRCULATING-PUMP-SHAFT BEARING APPARATUS

Application filed June 7, 1926. Serial No. 114,295.

My invention relates to a circulating pump shaft bearing apparatus, particularly as used for automotive boilers.

The principal objects of my invention are; first, to provide a circulating pump shaft with a cooling apparatus so that it will endure great temperature and pressure; second, to provide a circulating pump in which the packing apparatus and shaft are cooled by the intake water to the boiler; third, to provide a circulating pump with a novel pump shaft and thrust bearing apparatus; and, fourth, to provide a circulating pump apparatus of this class which is very simple and economical of construction, easy to install, efficient in its action and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a longitudinal sectional view through the circulating pump and shaft bearings; Fig. 2 is a sectional view on line 2—2 of Fig. 1, and Fig. 3 is a sectional view on line 3—3 of Fig. 1.

Similar characters of reference refer to similar parts and portions throughout the different views of the drawings.

The pump housing 1, stuffing box 2 and pump shaft 3 constitute the principal parts and portions of my circulating pump apparatus.

The shape of the pump housing is determined by the particular style of pump used, an inlet and outlet for the water from the boiler being required. From one side of the pump housing 1 projects an elongated boss 4 which forms a bearing for the pump shaft 3 which is revoluble in a bore 6 in the boss 4. Integrally formed on the end of the boss 4 is the enlarged portion 7 which provides the walls for the thrust bearing chamber 8 which is formed within the enlarged portion 7 by the enlarging of the bore 6. The thrust bearing chamber 8 is covered by the thrust bearing body 9 and having a boss 10 formed thereon on the same axis as the boss 4. The stuffing box 2 is placed on the end of the boss 10. A reduced portion $3^a$ of the shaft 3 revolves in bore 11 in the boss 10, and extends through the stuffing box 2. An inlet 12 to the thrust bearing chamber 8 is provided through the wall on one side of the enlarged portion 7. Diametrically opposite to the inlet 12 is provided an outlet 13. A thrust bearing 14 is provided within the thrust bearing chamber 8 on the thrust bearing body 9. A shoulder 15 formed by the reduction of the shaft 3 engages the thrust bearing 14. The reduced portion $3^a$ of the shaft 3 is driven in any conventional manner, thus causing the circulating pump to act upon the water from the boiler. As the shaft 3 revolves, the temperature on the shaft and bearings becomes greater, due to friction, aided by the presence of warm water through the pump. Cold feed water returning to the boiler is directed through the inlet 12 into the thrust bearing chamber 8 and, passing around the shaft 3 and thrust bearing 14, it continues to flow and passes out through the outlet 13 to the boiler, thus keeping the bearing parts and packing at a low temperature.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a circulating pump shaft bearing means, a circulating pump having an extended bearing enlarged at the end remote from the pump, a pump shaft revolubly mounted in said bearing and provided with a thrust portion thereon in the enlarged end of the extended bearing, a thrust member at the outer end of the extended bearing against which said thrust portion bears, said enlarged end having inlet and outlet means to admit and discharge circulating water for cooling said thrust bearing.

2. In a circulating pump shaft bearing apparatus, a bearing connected at one end with a pump housing and having therein, remote from said housing, a chamber and a thrust shoulder in said chamber on the side thereof remote from said housing, a pump shaft revolubly mounted in said bearing and extending through said chamber and said shoulder, a thrust collar on said shaft in engagement with said shoulder, and inlet and outlet means in connection with said chamber for conducting a cooling fluid thereinto against said collar.

3. In a circulating pump shaft bearing apparatus, a bearing connected at one end with a pump housing and having therein, remote from said housing, a chamber and a thrust shoulder in said chamber on the side thereof remote from the housing, a pump shaft tightly but revolubly mounted in said bearing between said chamber and said housing and extending through the bearing beyond the shoulder, a thrust collar on said shaft in engagement with the shoulder, and inlet and outlet means in connection with the chamber for conducting a cooling fluid thereinto.

4. In a circulating pump shaft bearing apparatus, a bearing connected at one end with a pump housing having therein, remote from said housing, a chamber and a thrust shoulder in said chamber on the side thereof remote from the housing, a pump shaft revolubly mounted in said pump bearing and extending from the pump housing to the opposite end of the bearing, the portion of the shaft extending from said shoulder to the outer end of the bearing being reduced, a thrust collar on the reduced portion of the shaft against the shoulder thereof formed between the reduced and larger diameter portion thereof, said collar being positioned in engagement with the shoulder in the chamber, and inlet and outlet means in connection with the chamber for conducting a cooling fluid thereinto.

In testimony whereof, I have hereunto set my hand at Los Angeles, California, this 25th day of May, 1926.

RUSSELL R. WATERMAN.